United States Patent [19]

Hellkuhl

[11] 3,975,892
[45] Aug. 24, 1976

[54] ROTARY RAKE FOR HAYING MACHINE USABLE FOR TEDDING AND WINDROWING

[75] Inventor: Ludger Hellkuhl, Gottmadingen, Germany

[73] Assignee: Maschinenfabrik Fahr Aktiengesellschaft, Gottmadingen, Germany

[22] Filed: Sept. 17, 1975

[21] Appl. No.: 614,220

[30] Foreign Application Priority Data

Sept. 18, 1974 Germany............................ 2444667

[52] U.S. Cl.................................... 56/365; 56/370
[51] Int. Cl.²......................................... A01D 81/00
[58] Field of Search ............. 56/370, 365, 366, 367, 56/370

[56] References Cited
UNITED STATES PATENTS 3,910,019   10/1975   Schlittler........................... 56/370 X Primary Examiner—J.N. Eskovitz
Attorney, Agent, or Firm—Karl F. Ross; Herbert Dubno

[57] ABSTRACT

A haying machine has a plurality of rotary rakes spaced apart transverse to its travel direction. Each rake has a plurality of tines extending through a housing rotatable about an upright axis and each having an inner end secured in a ball rotatable about an element nonrotatable in the housing but axially displaceable therein. The times each have an upper section about which they may be twisted by cam action, and a lower section that normally extends at a right angle to the ground. When the element in which the balls are carried is lifted all the way up control arms on the rake elements ride a cam to orient these elements with respect to the ground with the orbits of adjacent rakes spaced from each other, and when this bearing plate is lowered the control arms are moved out of contact with the cams in the housing and the rake elements are lifted so as to define an orbit of larger diameter that overlaps with the orbit of the neighboring rake.

10 Claims, 4 Drawing Figures

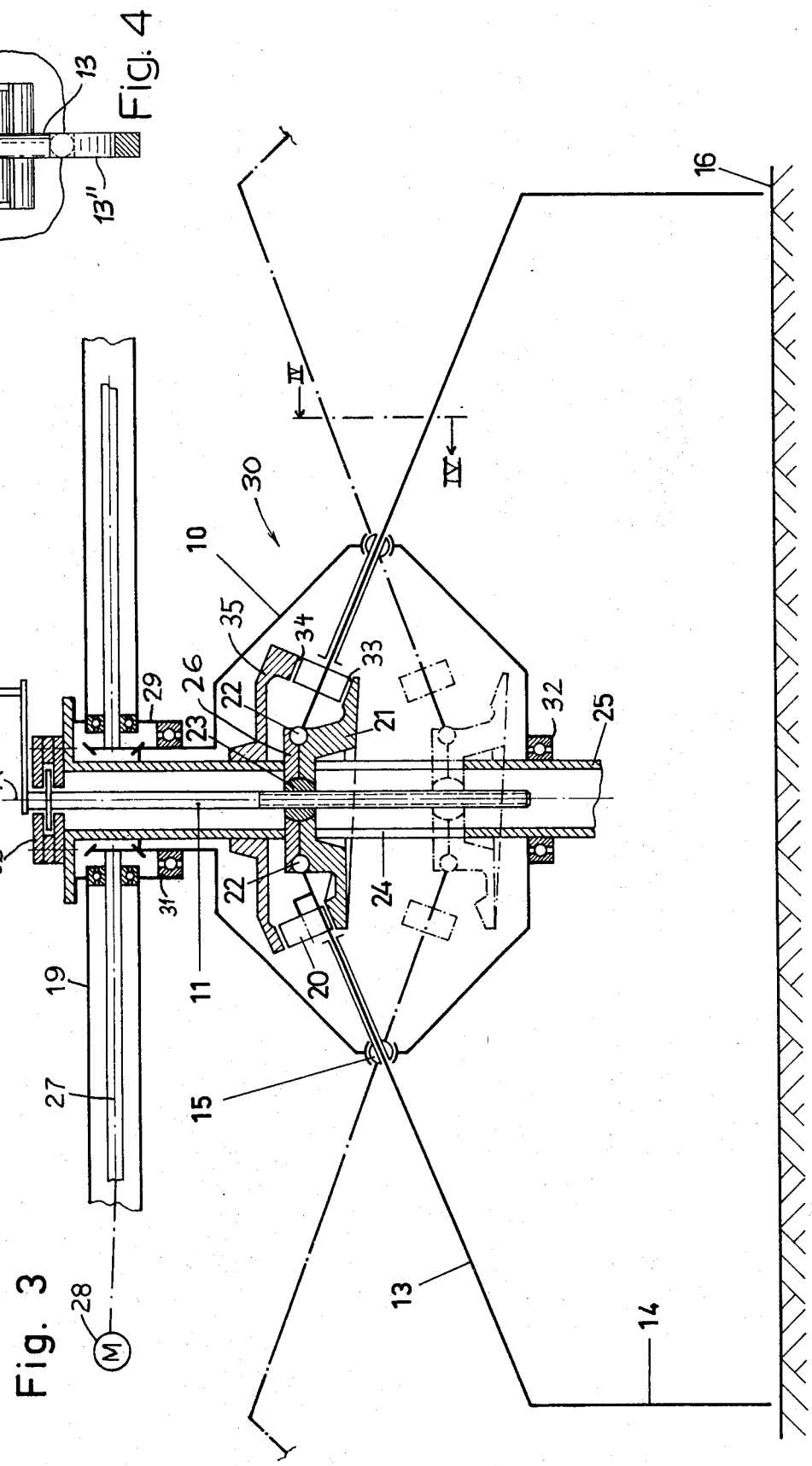

ROTARY RAKE FOR HAYING MACHINE USABLE FOR TEDDING AND WINDROWING

FIELD OF THE INVENTION

The present invention relates to a haying machine. More particularly this invention concerns an apparatus provided with rakes for windrowing and tedding hay or the like.

BACKGROUND OF THE INVENTION

Haying machines are known having a frame from which is suspended a plurality of rotary rakes each having an annular array of tines. The rakes are rotated codirectionally or are counterrotated and their tines are usually limitedly oscillatable about axes extending generally radially to the respective axis of rotation of the respective rake. The inner end of each tine is provided with a control arm that rides on a cam fixed to a central axial shaft. This cam may be axially displaced along the shaft by rotation of this shaft.

In one known type of haying machine (see example German published specification No. 2,164,080) the function of a tedder and a windrower are combined. During windrowing the rotation axis is vertical and the tines extend horizontally. The tips of the tines thus describe paths or orbits which are parallel to the ground. Control of the tines is effected by means of arms carried on the tines which ride during windrowing on a cam. For tedding the cam is held out of engagement with control arms so that the tines, for example biased by means of return springs, are held in a position in which their ends are directed toward the ground. In addition for tedding the rotation axis of the device is tipped relative to the ground so that the plane defined by the tips of the tines lies at an angle to the ground. At the point at which this plane is closest to the ground the tine ends extend essentially perpendicular to the ground. It is also necessary for tedding that the orbits of neighboring rakes overlap one another. This is effected by relatively complicated mechanical arrangements that require considerable time and patience for changeover between windrowing and tedding operations.

Another type of combined tedder-windrower is known (see Austrian Pat. No. 298,867) in which the cam is vertically fixed relative to the collar in which the tines are fitted so that it is possible to increase the diameter of the orbits of the tines of each rotary rig by pivoting each tine about an axis passing through the tine and tangential to an imaginary cylinder centered on the rotation axis. When the rotary-rake axis is vertical the tines extend horizontally so that the control arms can be pulled out of contact with the cam, allowing the bent ends of the tines to swing up. This creates a slight increase in the diameter. In order to obtain the necessary overlapping between orbits of adjoining rakes it is nonetheless still necessary to provide complicated mechanism to shorten the frame length between rakes. If the axis of each rake is tipped then the ends of the tines extend substantially perpendicularly to the ground while the plane defined by the orbits of the ends of these tines lies at an angle to the ground. It is necessary to displace each tine separately into the necessary position so that changeover time from tedding to raking is very long.

OBJECTS OF THE INVENTION

It is therefore an object of the present invention to provide an improved haying machine.

Another object is the provision of such a haying machine which may be useable for windrowing and tedding, and in which the changeover between these two functions may be effected very quickly and with a simple mechanism.

SUMMARY OF THE INVENTION

These objects are obtained according to the present invention in a haying machine having rotary rakes each provided with a central upright axle and, surrounding this axle, with a housing through which extends a plurality of angularly equispaced rake elements each constituting a tine at its outer end. The inner ends of the rake elements are secured on pivots such as balls that may ride around a track in a cam element vertically displaceable on the central axle. These ball pivots may ride in a ball bearing carried on the cam effective on the rake elements to pivot them about radial axes by engagement of control arms extending laterally from the rake elements and engaging the cam.

With such a system it is only necessary to displace the cam and ball bearing along the spindle in order to change over from the windrowing mode to the tedding mode. Thus very simple apparatus can fulfill the functions of a windrower and a tedder, with the changeover operation between these functions being so simple that it can be done in a minute or less.

The rake elements according to the present invention are thin wires or rods with a straight upper or main portion and a straight tine or end portion extending at an obtuse angle to the upper portion. The inner end of the upper portion is secured to the above-described pivot which may orbit around the axle, but which is axially coupled thereto. The upper main portion of the rake extends through a recess in a bearing on the housing that allows the respective rake element to rotate about the generally radial axis defined by the upper portion and about an axis tangential to an imaginary cylinder centered on the rake rotation axis. The upper element may slide in its outer bearing so that vertical displacement of the inner bearings from a position with the upper ends lying in a plane orthogonal to the rotation axis will pull the rake elements inwardly. When the inner bearings are lifted up from this central position the tine ends of the rake elements will extend at an angle of approximately 90° to the ground. This position, which is the windrowing position, the orbits defined by the rake elements are of minimum diameter and do not overlap. When the central bearing element is pushed downwardly from the central position the tines are swung out so that a maximum diameter is obtained and the orbits of adjacent rakes overlap. In this latter position the entire frame of the device is also tipped so that although the tips of the tines define a plane lying at an angle to the ground, these tines extend generally perpendicular to the ground at their point of closest approach to the ground.

BRIEF DESCRIPTION OF THE DRAWING

The above and other objects, features, and advantages will become more readily apparent from the following, reference being made to the accompanying drawing in which:

FIG. 3 is a vertical section through a rotary rake according to this invention; and FIG. 4 is a section taken along line IV—IV of FIG. 3.

SPECIFIC DESCRIPTION

Figure 1:
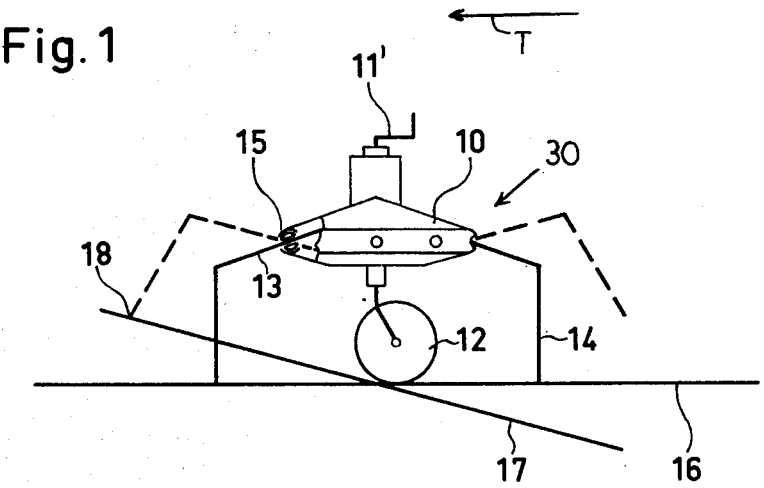
FIGS. 1 and 2 are side and back views, respectively, of rotary rake assembly in accordance with the present invention.
Figure 2:
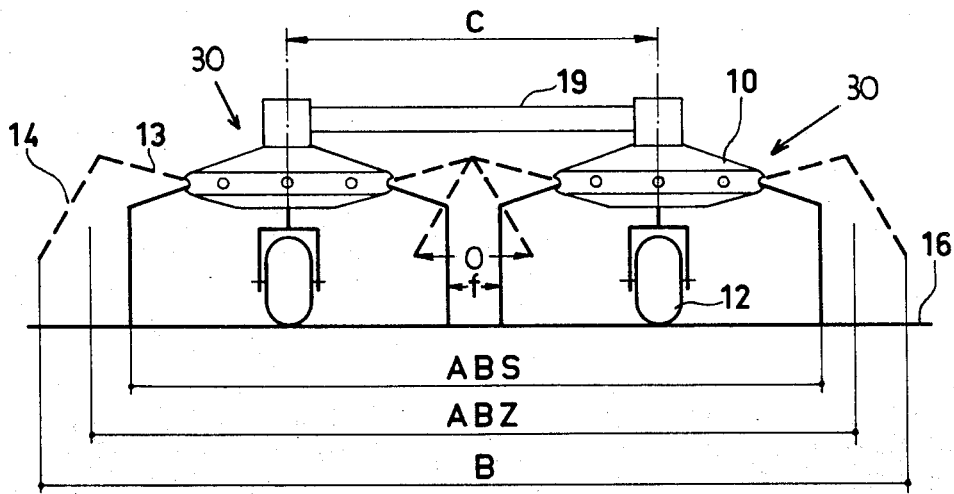

A hay machine according to the present invention as shown in FIGS. 1 and 2 has a frame 19 adapted to be displaced by a tractor or other prime mover in a normal direction of travel T. The frame 19 extends perpendicular to this direction T and parallel to the ground 16 and is provided with a plurality of rotary rakes 30 spaced apart by distance C. Each of the rotary rakes 30 has a housing 10 carried as shown in FIG. 3 via a bearing 31 in a hub 29. The upper edge of the housing 10 which is formed as a body of revolution centered on an axis A of the rotary rake 30 is formed as a bevel gear meshing with another such bevel gear carried on a drive shaft 27 extending through the frame 19 and itself driven by a motor 28 or the power takeoff of the tractor pulling the assembly. An upright tube 25 centered on the axis A is fitted at its lower end with a wheel 12 that can caster about the axis A and is adapted to ride on the ground 16 so as to support the rotary rake 30 above the ground. This tube 25 is nonrotatable about the axis A and the housing 10 is supported on it at its lower edge via a bearing 32.

Coaxial with each tube 25 is an adjustment rod 11 threaded at its lower end and lying on the axis A but secured at 33 from displacement in the direction of the axis A. A hand crank 11' is provided on the upper end of the axle 11 to allow it to be manually rotated about the axis A.

Eight rake elements 13 formed of very stiff wire extend through the housing 10 and are angularly equispaced about the axis A. The outer ends 14 of these rake elements 13 are straight and lie at an angle of 120° to the rake elements 13. Each rake element 13 passes through a recess in a respective bearing 15 in the housing 10, each bearing defining a pivot axis tangential to an imaginary cylinder centered on the axis A.

At its inner end each of the elements 13 is screwed into a ball 22 riding in an annular track formed between a bearing plate 26 and a cam 21 that are axially secured via a ball 23 to the axle 11 but which are nonrotatable relative to this axle 11, since webs in the plate 26 and cam 21 extend through axially elongated slots 24 formed in the tube 25.

Each of the rake elements 13 carries a short outrigger arm 13' that itself carries a roller 20 that rides between the upper surface 33 of the cam 21 and a correspondingly shaped lower surface 34 of another cam element 35 rotationally and axially fixed on the tube 25. The cam surfaces 33 and 34 therefore are able to rotate elements 13 limitedly about their longitudinal axes within the bearings 15 so that the tines 14 may define the requisite angle with the ground 16 during windrowing.

According to the present invention the crank 11' may be rotated so as to displace the lower element 21 down away from the upper element 35, thereby tipping the rake elements 13 up and pulling the rollers 20 out of contact with the surfaces 33, 34. Since the inner ends of the rake elements are secured to the balls 22, and since the lower position defined by the lower end of the slots 24 is further below an imaginary central position in which the elements 13 are all coplanar than the solid-line position of FIG. 3 is above this position, the rake element 13 will be withdrawn slightly within their bearings 15. FIG. 4 shows how each of the rake elements 13 has a square-section portion 13" which lies outside the bearing 15 when this element is in the solid-line windrowing position but which when withdrawn fits into a similar square-section hole 15' in the bearing 15 so as to prevent pivoting of the respective element 13 about its axis.

FIG. 2 shows how the tines 14 of a two-rake assembly are spaced apart from each other by a distance $f$ of 200 mm and define an overall distance ABS of 2340 mm.

For tedding the entire apparatus is tipped about the axis 19 and the elements 22 are dropped down to the dot-dash line position of FIG. 3. This raises the tines 14 so that the orbits of adjoining rakes 30 overlaps by a distance 0 of 400 mm and the arrangement has an overall width B of 2920 mm. At the same time for tedding the entire apparatus is tipped forwardly about an axis parallel to the frame 19 and to the ground 16, but perpendicular to the direction T of travel. This is illustrated in FIG. 1 where the ground is shown to lie in a plane 17 with the tines 14 approaching this plane 17 at a location 18 in front of the rakes 30. Due to the tipping of the entire mechanism the tines 14 therefore only sweep the ground ahead of the device across a distance ABZ of 2600 mm.

The elements 21 and 26 are secured together and effectively from a pair of ball bearing races for the balls 22. In addition these elements 26 and 21 may rock about the ball 23 into which the threaded section of the axle is screwed. The ends of slots 24 are shaped such that the plane of the race in which the balls 22 orbit is perpendicular to axis A when in the upper and lower positions. It is also within the scope of this invention to form the ends of these slots 24 such that the elements 21 and 26 are tipped at least to the lower position.

I claim:

1. In a haying machine a rotary rake comprising:
a support adapted to travel along the ground in a transport direction;
a housing;
means supporting said housing for rotation on said support about an upright housing axis fixed in said support and passing through said housing;
an axially fixed rod in said housing lying on and rotatable about said housing axis and having a threaded portion;
a nonrotatable cam in said housing threaded on said portion, whereby rotation of said rod about said housing axis axially displaces said cam;
a plurality of bearings angularly spaced about said housing and each formed with a generally radially extending recess and each pivotal about a respective bearing axis tangential to an imaginary cylinder centered on said housing axis;
a plurality of rake elements each having
an inner end,
an elongated and straight inner section extending generally radially from said inner end and from said housing and radially slidably received in a respective one of said recesses,
a control arm on said inner section engageable with said cam, and
an elongated outer section extending from said inner section; and means defining a pivot for each of said inner ends, each pivot being rotatable about said housing axis by a fixed radial distance and being orbitable at said distance around said housing axis, said pivots being fixed relative to said cam for joint displacement therewith along said housing axis.

2. The rake defined in claim 1 wherein said means defining said pivots is displaceable between an upper pooition with said pivots spaced a predetermined distance from respective bearings and a lower position with said pivots spaced a distance from the respective bearings greater than said predetermined distance.

3. The rake defined in claim 2 wherein said elements are provided with means for inhibiting their rotation about the longitudinal axes of their inner sections when in said lower position.

4. The rake defined in claim 3 wherein said means for inhibiting is a region of noncircular cross-sectional shape on said inner section of each rake and a correspondingly shaped region in the recess of the respective bearing.

5. The rake defined in claim 2 wherein each outer section is straight and extends from the respective inner section in a plane including said housing axis.

6. The rake defined in claim 5 wherein each outer section extends at an obtuse angle from the respective inner section.

7. The rake defined in claim 6 wherein in said upper position said inner sections lie in a plane orthogonal to said housing axis.

8. The rake defined in claim 6 wherein in said lower position said outer sections extend generally perpendicular to a plane perpendicular to said housing axis.

9. The rake defined in claim 1 wherein said means defining said pivots is a plate axially fixed to said cam and forming an annular track centered on said housing axis and lying in a plane perpendicular thereto, each inner section being provided with a bearing body orbitable in said track.

10. The rake defined in claim 9 wherein each body is a ball.

* * * * *